(12) United States Patent
Uehara

(10) Patent No.: US 8,237,792 B2
(45) Date of Patent: Aug. 7, 2012

(54) METHOD AND SYSTEM FOR DESCRIBING AND ORGANIZING IMAGE DATA

(75) Inventor: Yasuo Uehara, Ann Arbor, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 168 days.

(21) Appl. No.: 12/642,685

(22) Filed: Dec. 18, 2009

(65) Prior Publication Data

US 2011/0153617 A1    Jun. 23, 2011

(51) Int. Cl.
G06F 17/30 (2006.01)

(52) U.S. Cl. ........................ 348/143; 707/741

(58) Field of Classification Search .............. 348/143; 707/741
See application file for complete search history.

(56) References Cited

U.S. PATENT DOCUMENTS

| | | |
|---|---|---|
| 3,519,805 A | 7/1970 | Thorne-Booth |
| 3,783,974 A | 1/1974 | Gilbert et al. |
| 3,828,236 A | 8/1974 | Close |
| 3,848,671 A | 11/1974 | Kern |
| 3,918,552 A | 11/1975 | Kameyama et al. |
| 4,075,500 A | 2/1978 | Oman et al. |
| 4,380,049 A | 4/1983 | Makinen |
| 4,760,529 A | 7/1988 | Takata et al. |
| 4,926,630 A | 5/1990 | Shekleton |
| 5,046,919 A | 9/1991 | Wulf |
| 5,186,270 A | 2/1993 | West |
| 5,421,432 A | 6/1995 | Strambi et al. |
| 5,434,927 A | 7/1995 | Brady et al. |
| 5,474,370 A | 12/1995 | Ravndal |
| 5,604,821 A | 2/1997 | Ranganathan et al. |
| 5,739,657 A | 4/1998 | Takayama et al. |
| 5,774,591 A | 6/1998 | Black et al. |

(Continued)

FOREIGN PATENT DOCUMENTS

DE    10330922    2/2005

(Continued)

OTHER PUBLICATIONS

Ono, Shinichi, "Measurement of Flow Field Around a Wind Turbine with a Compact-type Brimmed Diffuse by a Particle Image Velocimetry", Advanced Engineering Faculty of Production of Construction Systems, pp. 1-6, (Japanese w/English Abstract).

*Primary Examiner* — Kim Nguyen

(74) *Attorney, Agent, or Firm* — Snell & Willmer LLP

(57) ABSTRACT

The present invention is directed to methods and systems for describing and organizing image data. An analysis system includes a sensor, a processing unit, a machine, a database, and/or a display. The analysis system is connected to an electronic device. The sensor generates sensor data which is imported by the processing unit. The processing unit analyzes the sensor data to determine features of the sensor data such as the subject, the time, the location, the object, the event, and/or the action in the sensor data. The processing unit creates entries for the sensor data in a features index. The processing unit receives a query for an item and uses the features index to determine search results including the item, such as a location and a time of the item. The processing unit can also determine whether a machine has completed its mission using the features in the sensor data.

8 Claims, 4 Drawing Sheets

U.S. PATENT DOCUMENTS

| | | |
|---|---|---|
| 6,246,787 B1 | 6/2001 | Hennessey et al. |
| 6,424,370 B1 * | 7/2002 | Courtney ............... 348/143 |
| 6,556,775 B1 | 4/2003 | Shimada |
| 6,647,324 B2 | 11/2003 | Creutzburg et al. |
| 6,680,748 B1 * | 1/2004 | Monti ............... 348/220.1 |
| 6,690,815 B2 | 2/2004 | Mihara et al. |
| 6,731,777 B1 | 5/2004 | Nishigaki et al. |
| 6,804,396 B2 | 10/2004 | Higaki et al. |
| 6,847,393 B2 * | 1/2005 | Ashe et al. ............... 348/61 |
| 6,853,738 B1 | 2/2005 | Nishigaki et al. |
| 6,907,335 B2 | 6/2005 | Oswald et al. |
| 6,963,656 B1 | 11/2005 | Persaud et al. |
| 6,985,623 B2 | 1/2006 | Prakash et al. |
| 7,000,200 B1 | 2/2006 | Martins |
| 7,018,166 B2 | 3/2006 | Gaskell |
| 7,056,185 B1 | 6/2006 | Anagnostou |
| 7,085,693 B2 | 8/2006 | Zimmerman |
| 7,106,887 B2 | 9/2006 | Kinjo |
| 7,131,136 B2 * | 10/2006 | Monroe ............... 725/105 |
| 7,142,600 B1 | 11/2006 | Schonfeld et al. |
| 7,218,011 B2 | 5/2007 | Hiel et al. |
| 7,230,538 B2 | 6/2007 | Lai et al. |
| 7,293,790 B2 | 11/2007 | Byun et al. |
| 7,340,077 B2 | 3/2008 | Gokturk et al. |
| 7,340,100 B2 | 3/2008 | Higaki et al. |
| 7,340,393 B2 | 3/2008 | Mitsuyoshi |
| 7,354,245 B2 | 4/2008 | Baba |
| 7,359,563 B1 | 4/2008 | Dua et al. |
| 7,370,466 B2 | 5/2008 | Cai |
| 7,382,244 B1 * | 6/2008 | Donovan et al. ............... 340/506 |
| 7,383,238 B1 | 6/2008 | Iverson |
| 7,391,339 B2 | 6/2008 | Howard et al. |
| 7,403,640 B2 | 7/2008 | Zhang et al. |
| 7,440,615 B2 | 10/2008 | Gong et al. |
| 7,444,287 B2 * | 10/2008 | Claudatos et al. ............... 704/270 |
| 7,489,802 B2 | 2/2009 | Smilansky |
| 7,641,288 B1 | 1/2010 | Baker et al. |
| 2003/0075907 A1 | 4/2003 | Baumann et al. |
| 2005/0002561 A1 | 1/2005 | Monachino et al. |
| 2005/0063566 A1 | 3/2005 | Beek et al. |
| 2005/0085984 A1 | 4/2005 | Uhler et al. |
| 2006/0028556 A1 | 2/2006 | Bunn et al. |
| 2006/0045354 A1 | 3/2006 | Hanna et al. |
| 2006/0104488 A1 | 5/2006 | Bazakos et al. |
| 2007/0027604 A1 | 2/2007 | Cuevas et al. |
| 2007/0098222 A1 | 5/2007 | Porter et al. |
| 2007/0140595 A1 | 6/2007 | Taylor et al. |
| 2007/0147678 A1 | 6/2007 | Gotting et al. |
| 2007/0211947 A1 | 9/2007 | Tkacik |
| 2007/0297647 A1 | 12/2007 | Hung-Chi |
| 2008/0002856 A1 | 1/2008 | Ma et al. |
| 2008/0049150 A1 | 2/2008 | Herbin et al. |
| 2008/0056548 A1 | 3/2008 | Irarrazaval et al. |
| 2008/0061559 A1 | 3/2008 | Hirshberg |
| 2008/0063273 A1 | 3/2008 | Shimodaira |
| 2008/0069400 A1 | 3/2008 | Zhu et al. |
| 2008/0095435 A1 | 4/2008 | Lipton et al. |
| 2008/0100704 A1 * | 5/2008 | Venetianer et al. ............... 348/143 |
| 2008/0144961 A1 | 6/2008 | Litzenberger et al. |
| 2008/0170748 A1 | 7/2008 | Albertson et al. |
| 2008/0186386 A1 | 8/2008 | Okada et al. |
| 2008/0220692 A1 | 9/2008 | Torres et al. |
| 2008/0253617 A1 | 10/2008 | Ernst et al. |
| 2008/0260210 A1 | 10/2008 | Kobeli et al. |
| 2008/0260212 A1 | 10/2008 | Moskal et al. |
| 2008/0273765 A1 | 11/2008 | Tsujimura |
| 2008/0292151 A1 | 11/2008 | Kurtz et al. |
| 2009/0003661 A1 | 1/2009 | Ionita et al. |
| 2009/0041297 A1 | 2/2009 | Zhang et al. |
| 2009/0060287 A1 | 3/2009 | Hyde et al. |
| 2009/0087308 A2 | 4/2009 | Presz, Jr. et al. |
| 2009/0097964 A1 | 4/2009 | Presz, Jr. et al. |
| 2009/0146842 A1 | 6/2009 | Jung |
| 2010/0026802 A1 * | 2/2010 | Titus et al. ............... 348/143 |
| 2010/0038960 A1 | 2/2010 | Takenaka et al. |
| 2010/0096905 A1 | 4/2010 | Takenaka et al. |
| 2011/0090084 A1 * | 4/2011 | Williams et al. ............... 340/541 |

FOREIGN PATENT DOCUMENTS

| | | |
|---|---|---|
| EP | 1614585 | 1/2006 |
| JP | 58086803 | 5/1983 |
| JP | 9058461 | 3/1997 |
| JP | 2003259502 | 9/2003 |
| JP | 2003338997 | 11/2003 |
| JP | 3738266 | 1/2006 |
| JP | 2006335277 | 12/2006 |
| JP | 2007094990 | 4/2007 |
| JP | 2007196867 | 8/2007 |
| JP | 2007210576 | 8/2007 |
| JP | 2008279848 | 11/2008 |
| WO | WO 86-03132 | 6/1986 |
| WO | WO 2007029454 | 3/2007 |
| WO | WO 2007039927 | 4/2007 |
| WO | WO 2007132323 | 11/2007 |

* cited by examiner

METHOD AND SYSTEM FOR DESCRIBING AND ORGANIZING IMAGE DATA

BACKGROUND

1. Field

The present invention relates to a method and system for describing and organizing image data.

2. Description of the Related Art

Conventional video analysis systems extract only a limited amount of information from a video clip. This can hamper the ability of a third party to determine exactly what occurred in the video. For example, such systems may only determine whether a subject in the video clip is either suspicious or non-suspicious. Such binary analysis of whether something is either suspicious or non-suspicious or moving or non-moving provides limited value to the user in determining exactly what happens in the video clip. For example, the user will not be able to determine what the subject was doing, such as whether the subject was moving an object, running, or helping someone. Furthermore, such systems are unable to help the user find a lost object since the focus is only on the subject and the analysis is only whether the subject meets a predetermined threshold.

This binary analysis in conventional video analysis systems also limit the usefulness of the video clip for situations unanticipated by the original conventional video analysis due to the limited amount of information extracted. In addition, with limited amount of information extracted, conventional video analysis systems are also unable to handle large data volumes and thus video data with certain features may be hard to find.

Furthermore, conventional video analysis systems limited applications due to their limited information collection and organization abilities. Thus, they are unable to determine whether a machine has completed a mission since limited data comparisons hamper the ability of the system to determine whether the machine has truly completed a mission.

Thus, there is a need for an improved method and system for describing and organizing image data.

SUMMARY

The present invention is directed to a method and system for describing and organizing image data. The present invention can include an analysis system. The analysis system can include a sensor, a processing unit, a machine, a database, and/or a display. The analysis system can be connected to an electronic device. The sensor can generate sensor data which is imported by the processing unit. The processing unit can analyze the sensor data to determine features of the sensor data such as the subject, the time, the location, the object, the event, and/or the action in the sensor data. The processing unit can also create entries for the sensor data in a features index using the subject, the time, the location, the object, the event, and/or the action in the sensor data. Furthermore, the processing unit can receive a query for an item and the processing unit can use the features index to determine search results including the item, such as a location and a time of the item. In addition, the processing unit can also determine whether a machine has completed its mission using the features in the sensor data.

In one embodiment, the present invention is a method of analyzing a scene including importing sensor data, identifying a subject in the sensor data, identifying a time in the sensor data, identifying a location in the sensor data, identifying an object in the sensor data, identifying an event in the sensor data, identifying an action in the sensor data, and creating an entry in the feature index for the sensor data from the subject, the time, the location, the object, the event, and the action.

A method for finding an item including importing sensor data, identifying a subject in the sensor data, identifying a time in the sensor data, identifying a location in the sensor data, identifying an object in the sensor data, identifying an event in the sensor data, identifying an action in the sensor data, creating an entry in the feature index for the sensor data from the subject, the time, the location, the object, the event, and the action, receiving a query for an item, searching the feature index to determine whether the item is contained in the sensor data, and displaying the result of the search.

A method for operating a machine including receiving a mission state of the machine, receiving a current state of the machine, analyzing the mission state of the machine and the current state of the machine, continuing to operate the machine when the mission state of the machine and the current state of the machine are substantially different, and ceasing to operate the machine when the mission state of the machine and the current state of the machine are substantially the same.

BRIEF DESCRIPTION OF THE DRAWINGS

The features, obstacles, and advantages of the present invention will become more apparent from the detailed description set forth below when taken in conjunction with the drawings, wherein.

DETAILED DESCRIPTION

Apparatus, systems and methods that implement the embodiments of the various features of the present invention will now be described with reference to the drawings. The drawings and the associated descriptions are provided to illustrate some embodiments of the present invention and not to limit the scope of the present invention. Throughout the drawings, reference numbers are re-used to indicate correspondence between referenced elements.

Figure 1:
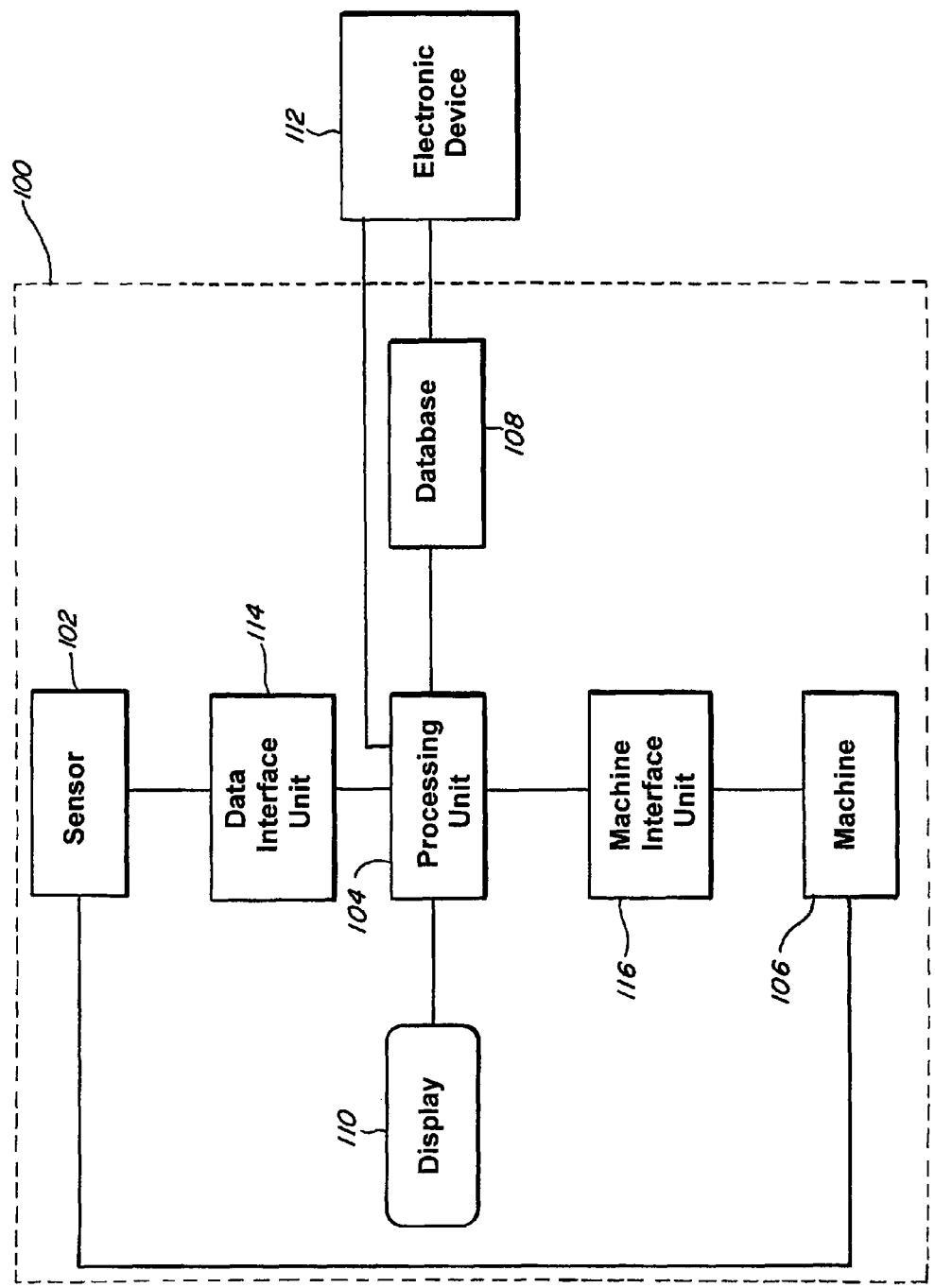
FIG. 1 is a schematic diagram of a system in communication with an electronic device according to an embodiment of the present invention.

In one embodiment, the present invention includes an analysis system 100 as shown in FIG. 1. The analysis system 100 can include, for example, a sensor 102, a processing unit 104, a machine 106, a database 108, a display 110, a data interface unit 114, and/or a machine interface unit 116. The analysis system 100 can optionally be in communication with an electronic device 112. The electronic device 112 can be, for example, a processor, a user input device, a computer, a portable device, a mobile phone, a personal digital assistant, or any other type of electronic equipment that can utilize data and information generated and/or processed by the analysis system 100.

The sensor 102 is connected to the processing unit 104 through, for example, the data interface unit 114. The sensor 102 can also be connected, for example, to the machine 106. The sensor 102 can be, for example, a distance sensor, a video camera, a digital camera, a microphone, an infrared sensor, a motion sensor, a global positioning system, and/or any other type of sensor that can provide relevant data to the processing unit 104. The sensor 102 can provide sensor data such as distance data, video data, image data, audio data, infrared data, motion data, global positioning system data, and/or any other types of data relevant to the processing unit 104. For example, the sensor 102 can generate the sensor data from an operation of the machine 106. The sensor 102 can generate the sensor data from events or objects external to the analysis system 100. However, the sensor 102 can also generate the sensor data from events or objects internal to the analysis system 100.

The data interface unit 114 can be connected to the sensor 102 and/or the processing unit 104. The data interface unit 114 can provide an interface between the sensor 102 and the processing unit 104. This can allow, for example, the processing unit 104 to import sensor data from the sensor 102.

The machine 106 is connected to the processing unit 104, for example, through the machine interface unit 116. The machine 106 can receive instructions from the processing unit 104 through, for example, the machine interface unit 116. The machine 104 can be, for example, a computer, an engine, a motor, and/or any other type of equipment. The machine 104 can operate or cease to operate based on the instructions from the processing unit 104. Thus, for example, in the situation where the machine 106 is the engine of an automobile, the automobile may have set guidelines for reaching a destination. The guidelines will then be the mission state. The engine will continue to run until the mission state is accomplished, or the guidelines have been met. For example, the mission state can include the automobile reaching a certain location at a certain time or having a certain speed by a certain time.

The machine interface unit 116 can be connected to the machine 106 and/or the processing unit 104. The machine interface unit 116 can provide an interface between the machine 106 and the processing unit 104. This can allow, for example, the processing unit 104 to control the machine 106.

The processing unit 104 can be connected, for example, to the database 108, the display 110, the electronic device 112, the data interface unit 114, and/or the machine interface unit 116. The processing unit 104 can import, receive, process, and/or analyze the sensor data to determine features within the sensor data from the sensor 102. The features can, for example, describe the sensor data, and also be used to organize the sensor data. The processing unit 104 can identify features such as, a subject in the sensor data, a time in the sensor data, a location in the sensor data, an object in the sensor data, an event in the sensor data, and/or an action in the sensor data. In addition, additional features can be appropriately identified.

The subject in the sensor data can be, for example, the subject performing the action on the object. The time in the sensor data can be the start time of the sensor data, the end time of the sensor data, or the time at any portions of the sensor data. In one embodiment, the sensor data can have multiple times associated with it. The location in the sensor data can be, for example, the location of the subject, and/or the object. The location in the sensor data can also be, for example, the geographic location of the system 100, the sensor 102, the machine 106, the processing unit 104, the database 108, the display 110, and/or the electronic device 112. The object can be, for example, the target and/or recipient of the action by the subject. The event can be, for example, a general classification of what happened between the subject and the object. The action can be, for example, an action performed by the subject on the object.

For example, if the sensor data was a video clip of a person placing a pair of glasses in a drawer in the living room at 10:00 a.m. on Sunday, Dec. 6, 2009, the subject would be the person. The time would be 10:00 a.m. on Sunday, Dec. 6, 2009. The location would be the living room. The object would be the pair of glasses. The event would be the storage of the item. The action would be placing and/or storing since the person placed the glasses in the drawer, thus the storing of the item. In addition, other entries can be used for the features. For example, the time can also be the time in the video clip. If the time was 25 minutes into a 30 minute video clip, then the time would be 25 minutes instead of or in addition to being 10:00 a.m. on Sunday, Dec. 6, 2009. Furthermore, the frame number of the video clip can also be used. The object can also be the drawer, since the person will have opened the door and placed the object in the drawer. In addition, the event can also be manipulation of the drawer. Also, the action can be opening and/or closing the drawer.

From the subject, the time, the location, the object, the event, and/or the action in the sensor data, the processing unit 104 can create one or more entries in a feature index corresponding to the sensor data. This can, for example, organize the sensor data. The feature index can be one or more consolidated indexes organized by the subject, the time, the location, the object, the event, the action, or any other types of organization. The feature index can also be organized alphabetically. Furthermore, the sensor data can have multiple entries in the feature index. For example, the sensor data can have an entry regarding the subject of the sensor data, an entry regarding the time of the sensor data, an entry regarding the location of the sensor data, an entry regarding the object of the sensor data, an entry regarding the event of the sensor data, and/or an entry regarding the action of the sensor data. Furthermore, there can be multiple entries for each of the subject, the time, the location, the object, the event, and/or the action of the sensor data. The processing unit 104 can send the sensor data, and/or the feature index to the database 108 to be stored by the database 108. However, in one embodiment, the processing unit 104 can also store, for example, the sensor data and/or the feature index.

The processing unit 104 can also help find a lost item. For example, the sensor data can be a video clip of a person using an item. The processing unit 104 can determine the subject, the time, the location, the object, the event, and/or the action in the video clip and create one or more entries in the feature index. Subsequently, the processing unit 104 can receive a query related to the item. The processing unit 104 can then search the feature index for an entry corresponding to the item and display the search results for the item.

The processing unit 104 can also determine whether the query received will be sufficient to produce search results with a sufficient specificity. The processing unit 104 can request additional information and/or a more detailed query when the processing unit 104 determines that the query received will be insufficient to produce search results with a sufficient specificity.

For example, if the query produces too many results or the results will be too broad, then the processing unit 104 can request additional information and/or a more detailed query. The processing unit 104 can instruct the display 110 to display the search results. The search results can include a time and a location of the item. If the item is located on multiple portions of the video clip, there can be multiple times and locations displayed for the item. Thus, the item can easily be located by determining where it was at what time. This can help a person, such as a person with a reduced memory capacity in locating items.

The query is not limited to just finding an item, but can be used to search for any type of entry in the features index, such as the subject, the time, the location, the object, the action, and/or the event. This may be beneficial, for example, in crime scene analysis where there are many sensor data and/or video data that have to be analyzed.

Furthermore, the present invention can also be used, for example, in an automobile where components of the automobile may need to analyze the sensor data to determine adjustments to the vehicle. For example, to determine whether the automobile needs to enter traction control mode, the automobile can search the features index to determine the time and location where snow was detected. Furthermore, if objects in the road are detected, the automobile can search the features index to determine whether a speed of the automobile should be reduced. The automobile can also analyze the sensor data to maintain a distance to an object.

The processing unit 104 can also determine whether a mission of a machine was completed. For example, the processing unit 104 can receive a mission state, such as the mission state of the machine 106. The mission state can include a subject, a time, a location, an object, an event, and/or an action. The processing unit 104 can compare the mission state of the machine 106 to the sensor data of the machine 106 and determine whether the machine 106 has completed its mission. Thus, the processing unit 104 can compare the subject, the time, the location, the object, the event, and/or the action of the mission state to the subject, the time, the location, the object, the event, and/or the action of the sensor data.

When the mission state and the sensor data substantially match, then the mission is complete for the machine 106. The processing unit 104 can then instruct the machine 106 to cease operating. Otherwise, the machine 106 has not completed its mission, and the processing unit 104 can instruct the machine 106 to continue operating. For example, if the subject, the time, the location, the object, the event, and/or the action of the mission state substantially matches the subject, the time, the location, the object, the event, and/or the action of the sensor data, then the processing unit 104 can determine that the mission for the machine 106 is completed.

For example, the mission state of the machine 106 can be an arm of a machine should shrink wrap 5,000 products in the warehouse by 10:00 a.m. on Sunday, Dec. 6, 2009. In such a case, the subject can be the machine, the time can be 10:00 a.m. on Sunday, Dec. 6, 2009, the location can be the warehouse, the object can be the products, the event can be the progress report, and the action can be the shrink wrapping. When the sensor data substantially matches the mission state, then the machine 106 can cease to operate. However, if the sensor data does not substantially match the mission state, then the machine 106 can continue to operate. Furthermore, not all of the features need be utilized. For example, the deadline is 10:00 a.m. on Sunday, Dec. 6, 2009. If the deadline is not met, the machine 106 can still cease to operate once all of the other features in the mission state match the sensor data. However, an entry in the feature index can be placed to note the inability to complete the mission on time.

Furthermore, the machine 106 can also have parallel missions, such as obstacle avoidance and changing lanes when the machine 106 is an automobile. The obstacle avoidance may be the default mission that is active all of the time while the changing lane mission can be a mission that is periodically activated. In one embodiment, the changing lane mission can have sub-missions such as maintaining distance and/or speed to objects and/or road signs, maintaining the automobile in a current lane that the automobile is in, checking a target lane, checking a target lane for clearance and/or obstacles, checking objects with transient states such as crossing lane markers, moving the automobile into the target lane, and/or maintaining the automobile in the target lane.

The database 108 can be connected, for example, to the processing unit 104. The database 108 can be, for example, a memory and/or a storage unit. The database 108 can store the sensor data, and/or the feature index. The database 108 can also store any other data relevant to the processing unit 104, the electronic device 112, and/or the machine 106.

The display 110 can be connected, for example, to the processing unit 104. The display can display, for example, the search results, the sensor data, entries in the feature index, portions of the feature index, the entire feature index, and/or any other information that should be displayed.

Figure 2:
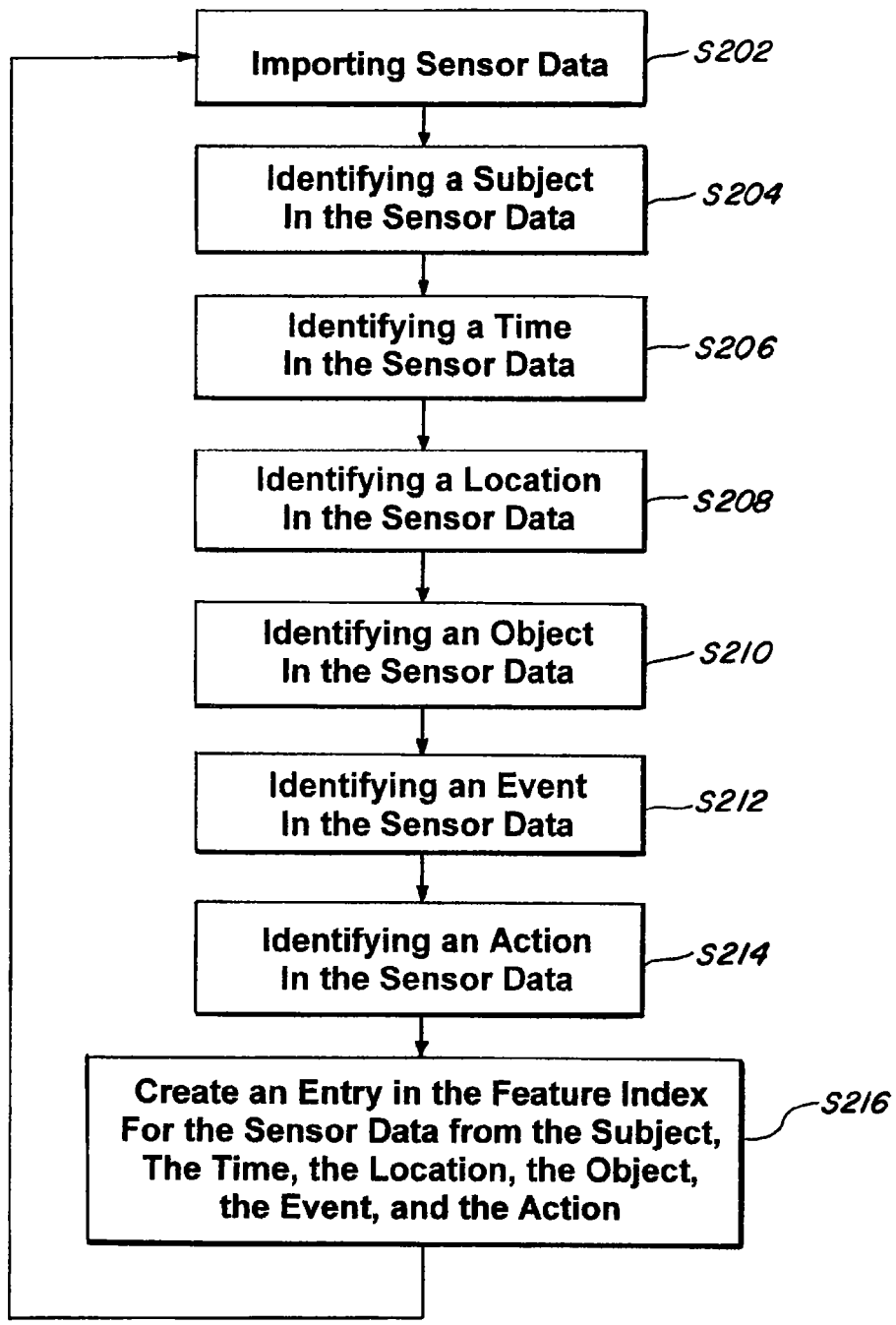
FIG. 2 is a process according to an embodiment of the present invention.

In one embodiment, the present invention is a process according to FIG. 2. In Step S202, the sensor data is imported. For example, the sensor data from the sensor 102 is imported by the processing unit 104. In Step S204, a subject in the sensor data is identified. For example, the processing unit 104 identifies a subject in the sensor data. In Step S206, a time is identified in the sensor data. For example, the processing unit 104 can identify a time in the sensor data. In Step S208, a location in the sensor data is identified. For example, the processing unit 104 can identify the location in the sensor data.

In Step S210, the object in the sensor data is identified. For example, the processing unit 104 can identify the object in the sensor data. In Step S212, an event in the sensor data is identified. For example, the processing unit 104 can identify the event in the sensor data. In Step S214, an action in the sensor data is identified. For example, the processing unit 104 can identify the action in the sensor data. In Step S216, an entry in the feature index for the sensor data is created from the subject, the time, the location, the object, the event, and the action in the sensor data.

In one embodiment, the Steps S202 through Steps S216 can be repeated, for example, until substantially all of the sensor data has been processed. In another embodiment, the Steps S202 through Steps S216 can be repeated until the processing unit 104 determines it has appropriately processed enough sensor data or that the process should be halted. In yet another embodiment, the Steps S204 through Steps S214 may be done in parallel, serially, or any combination of parallel and serial. Furthermore, an entry may be created in the feature index as soon as any of the features, such as the subject, the time, the location, the object, the event, and/or the action has been identified.

Figure 3:
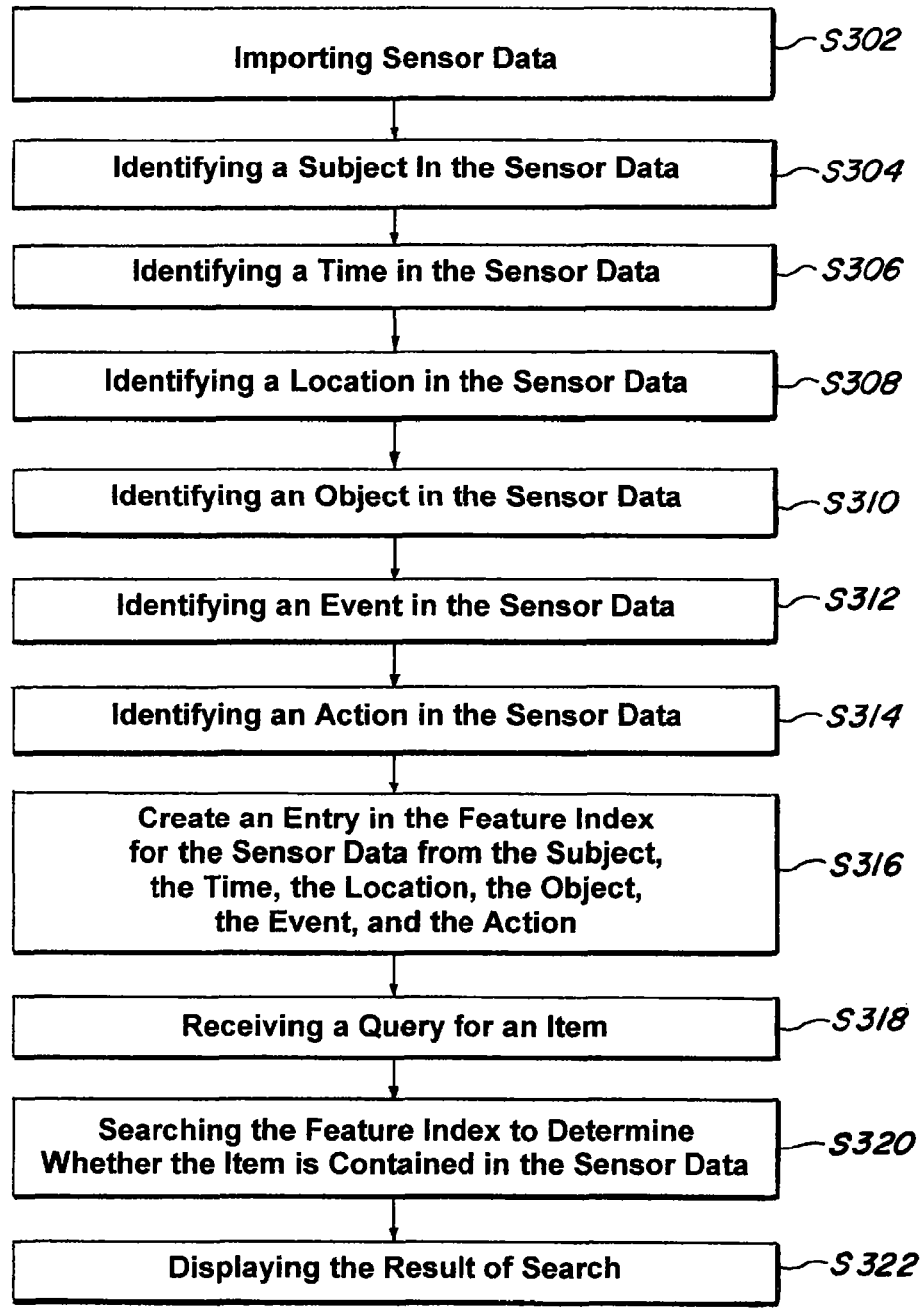
FIG. 3 is a process according to an embodiment of the present invention.

In one embodiment, the present invention is a process according to FIG. 3. In Step S302, sensor data can be imported. For example, the processing unit 104 can import sensor data from the sensor 102. In Step S304, a subject is identified in the sensor data. For example, the processing unit 104 can identify the subject in the sensor data. In Step S306, a time in the sensor data is identified. For example, the processing unit 104 can identify the time in the sensor data. In Step S308, a location in the sensor data is identified. For example, the processing unit 104 can identify the location in the sensor data. In Step S310, an object in the sensor data is identified. For example, the processing unit 104 can identify the object in the sensor data.

In Step S312, an event in the sensor data is identified. For example, the processing unit 104 can identify the event in the sensor data. In Step S314, an action in the sensor data is identified. For example, the processing unit 104 can identify the action in the sensor data. In Step S316, an entry in the feature index can be created for the subject, the time, the location, the object, the event, and/or the action in the sensor data. For example, the processing unit 104 can create an entry or multiple entries in the feature index for the subject, the time, the location, the object, the event, and/or the action in the sensor data. In Step S318, a query for an item can be received. For example, the processing unit 104 can receive a query for an item from the electronic device 112 and/or the machine 106.

In Step S320, the feature index can be searched to determine whether the item is contained in the sensor data. For example, the processing unit 104, the feature index is searched to determine whether the item is contained in the sensor data. For example, the processing unit 104 can search the feature index to determine whether the item is contained in the sensor data. Alternatively, the electronic device 112 can search the feature index to determine whether the item is contained in the sensor data. In Step S322, the results of the search can be displayed. For example, the display 110 can display the results of the search at the instruction of the processing unit 104 and/or the electronic device 112.

In one embodiment, Step S318 can be performed at any time in the process. Thus, for example, the query for the item can be received at any time and not necessarily between Steps S316 and S320. In another embodiment, the Steps S304 through Steps 314 may be done in parallel, serially, or any combination of parallel and serial. Furthermore, an entry may be created in the feature index as soon as any of the features, such as the subject, the time, the location, the object, the event, and/or the action has been identified.

Figure 4:
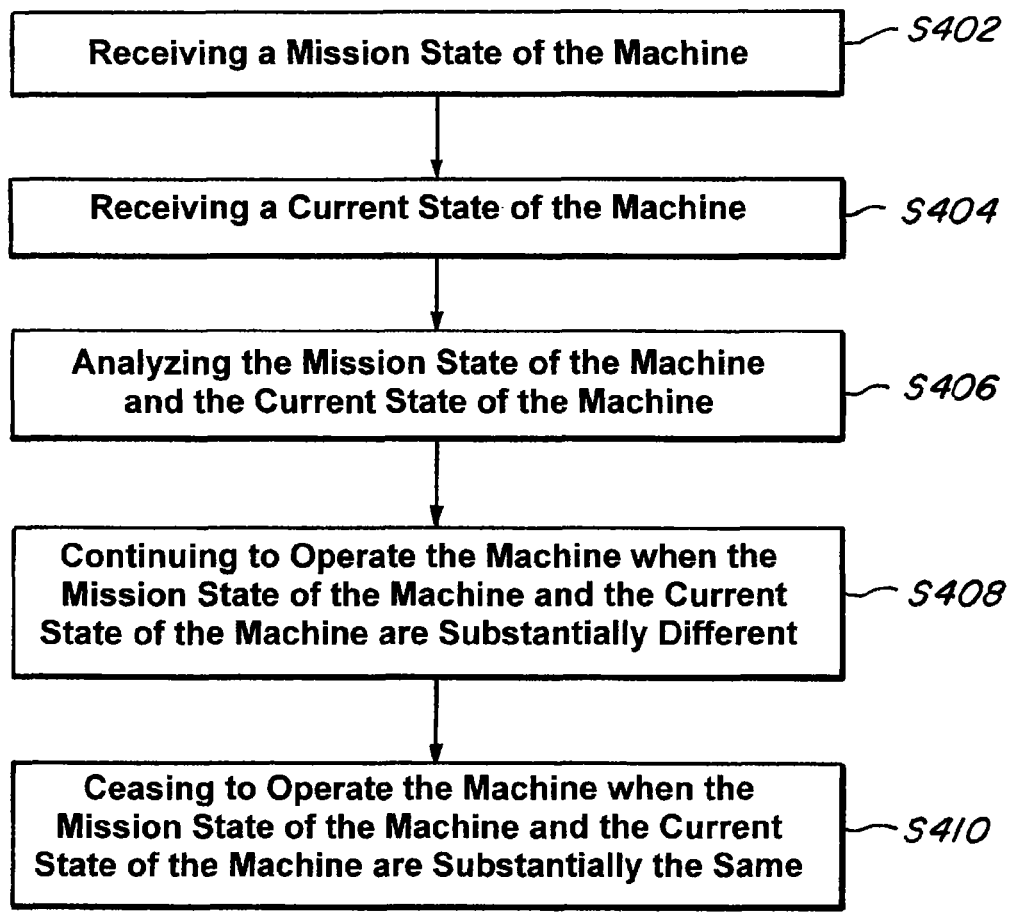
FIG. 4 is a process according to an embodiment of the present invention.

In another embodiment, the present invention is a process according to FIG. 4. In Step S402, a mission state of a machine is received. For example, the processing unit 104 can receive the mission state of the machine 106 from the electronic device 112. In Step S404, a current state of the machine 106 is received. For example, the current state of the machine 106 can be received from the sensor 102. In Step S406, the mission state of the machine and the current state of the machine are analyzed. For example, the processing unit 104 analyzes the mission state of the machine 106 and the current state of the machine 106.

In Step S408, the machine 106 continues to operate when the mission state of the machine and the current state of the machine are substantially different. For example, the machine 106 can continue to operate when the mission state of the machine 106 and the current state of the machine 106 are substantially different. The machine 106 can continue to operate, for example, at the direction of the processing unit 104 and/or the electronic device 112. In Step S410, the machine ceases to operate when the mission state of the machine and the current state of the machine are substantially the same. For example, the machine 106 can cease to operate, when the mission state of the machine 106 and the current state of the machine 106 are substantially the same. The machine 106 can cease to operate, for example, at the direction of the processing unit 104 and/or the electronic device 112. In one embodiment, the Steps S402 and S404 may be done in parallel, serially, or any combination of parallel and serial.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A method of analyzing a scene comprising:
   importing sensor data;
   identifying a subject in the sensor data;
   identifying a time in the sensor data;
   identifying a location in the sensor data;
   identifying an object in the sensor data;
   identifying an event in the sensor data;
   identifying an action in the sensor data;
   creating an entry in the feature index for the sensor data from the subject, the time, the location, the object, the event, and the action;
   receiving a first input of a subject, a time, a location, an object, an event, or an action defining a first mission;
   receiving a second input of a subject, a time, a location, an object, an event, or an action defining a second mission;
   repeatedly comparing the first input defining the first mission to the subject, the time, the location, the object, the event, or the action from the sensor data at a first repetition rate;
   repeatedly comparing the second input defining the second mission to the subject, the time, the location, the object, the event, or the action from the sensor data at a second repetition rate slower than the first repetition rate;
   determining that the first mission is completed when the first input defining the first mission and the subject, the time, the location, the object, the event, or the action from the sensor data substantially match; and
   determining that the second mission is completed when the second input defining the second mission and the subject, the time, the location, the object, the event, or the action from the sensor data substantially match.

2. The method of claim 1 wherein the sensor data includes a video clip.

3. The method of claim 2 further comprising using the video clip to identify the subject in the sensor data, the time in the sensor data, the location in the sensor data, the object in the sensor data, the event in the sensor data, or the action in the sensor data.

4. The method of claim 1 wherein the sensor data includes images.

5. The method of claim 1 wherein the sensor data includes global positioning system data.

6. The method of claim 1 further comprising accessing the sensor data using the feature index.

7. The method of claim 1 further comprising inputting a query and retrieving the results of the query using the feature index.

8. The method of claim 7 wherein the query is for finding a subject or an object that was lost.

* * * * *